(12) United States Patent
Ash et al.

(10) Patent No.: US 6,405,977 B1
(45) Date of Patent: Jun. 18, 2002

(54) MODULAR AIR INTAKE DUCT FOR AIRCRAFT

(75) Inventors: Geoffrey J Ash; Colin Whaites; Peter R House, all of Preston (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 09/623,798

(22) PCT Filed: Mar. 17, 2000

(86) PCT No.: PCT/GB00/00997

§ 371 (c)(1),
(2), (4) Date: Sep. 8, 2000

(87) PCT Pub. No.: WO00/56602

PCT Pub. Date: Sep. 28, 2000

(30) Foreign Application Priority Data

Mar. 23, 1999 (GB) ............................................. 9906621

(51) Int. Cl.[7] ............................................. B64D 33/00
(52) U.S. Cl. ..................................... 244/53 B
(58) Field of Search ................ 244/52, 53 B, 244/53 R, 73 R, 120; 137/15.1, 15.2

(56) References Cited

U.S. PATENT DOCUMENTS

| 3,589,379 | A | * | 6/1971 | Daues |
| 3,717,163 | A | * | 2/1973 | Herr |
| 4,043,522 | A | | 8/1977 | Vetter |
| 5,078,341 | A | | 1/1992 | Bichler et al. |
| 5,490,644 | A | * | 2/1996 | Koncsek et al. ........... 244/53 B |
| 5,586,735 | A | * | 12/1996 | Falempin et al. .......... 244/53 B |
| 5,787,703 | A | * | 8/1998 | Fougerousse .................. 60/225 |
| 5,897,078 | A | * | 4/1999 | Burnham et al. ............. 244/117 |

FOREIGN PATENT DOCUMENTS

| DE | 29 15 008 | 10/1980 |
| DE | 31 14 101 A1 | 10/1982 |
| EP | 0 103 384 A | 3/1984 |
| EP | 0 441 461 A2 | 8/1991 |
| GB | 2 046 193 A | 11/1980 |
| GB | 2 148 809 A | 6/1985 |
| GB | 2 242 402 A | 10/1991 |
| GB | 2 274 490 A | 7/1994 |
| WO | 94/01735 | 1/1994 |
| WO | 97/22516 | 6/1997 |

* cited by examiner

Primary Examiner—Peter M. Poon
Assistant Examiner—Kevin Jakel
(74) Attorney, Agent, or Firm—Nixon & Vanderhye P.C.

(57) ABSTRACT

A modular air intake duct system for a vehicle including at least on intake duct and an attachment for attaching the intake duct to at least one structural member of the vehicle. The at least one intake duct is adapted to be demountably attached to a load bearing structural member of the vehicle where at least one intake duct itself is adapted to bear substantially no load. The intake duct is modular and has at least one module.

11 Claims, 4 Drawing Sheets

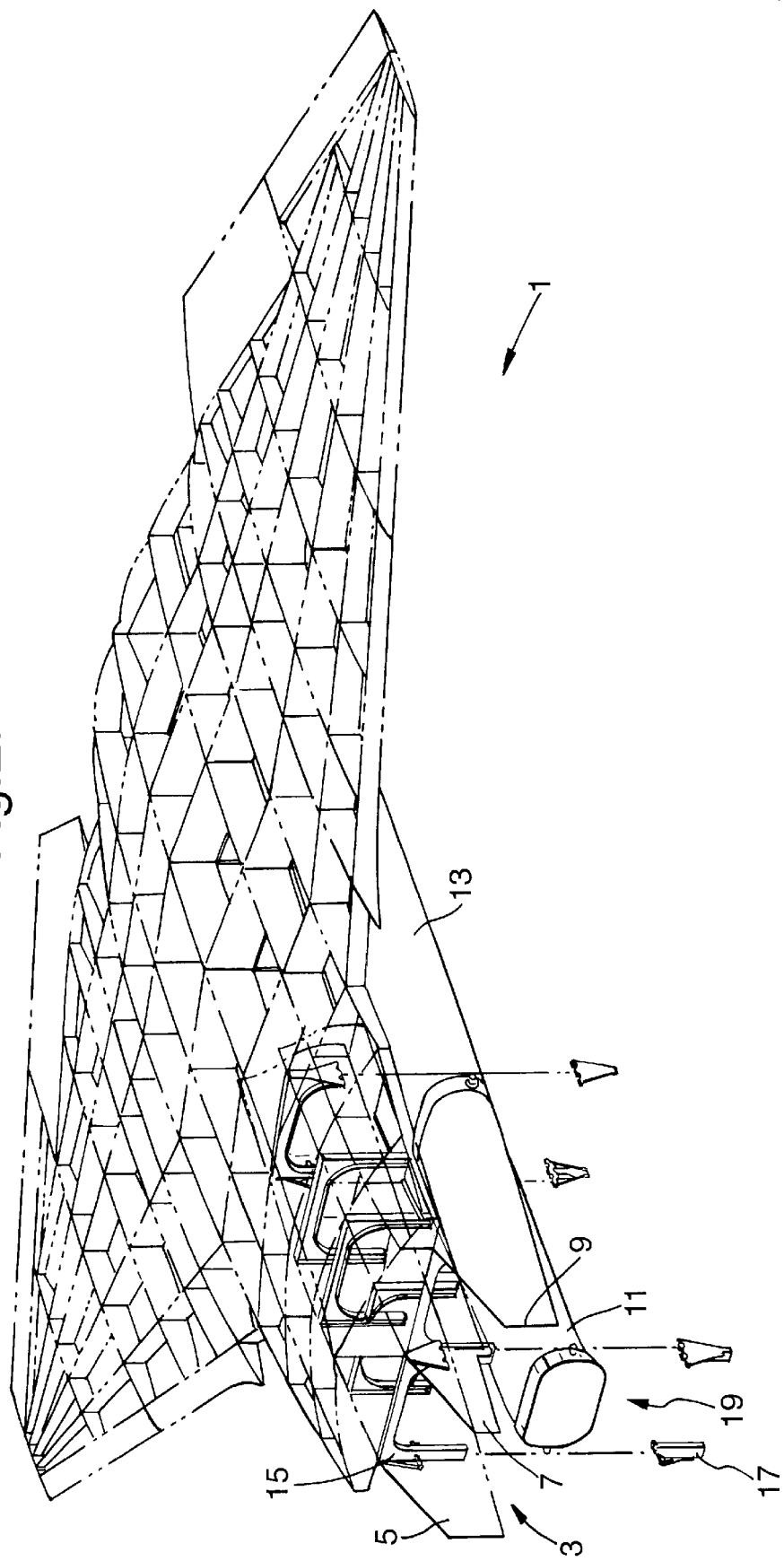

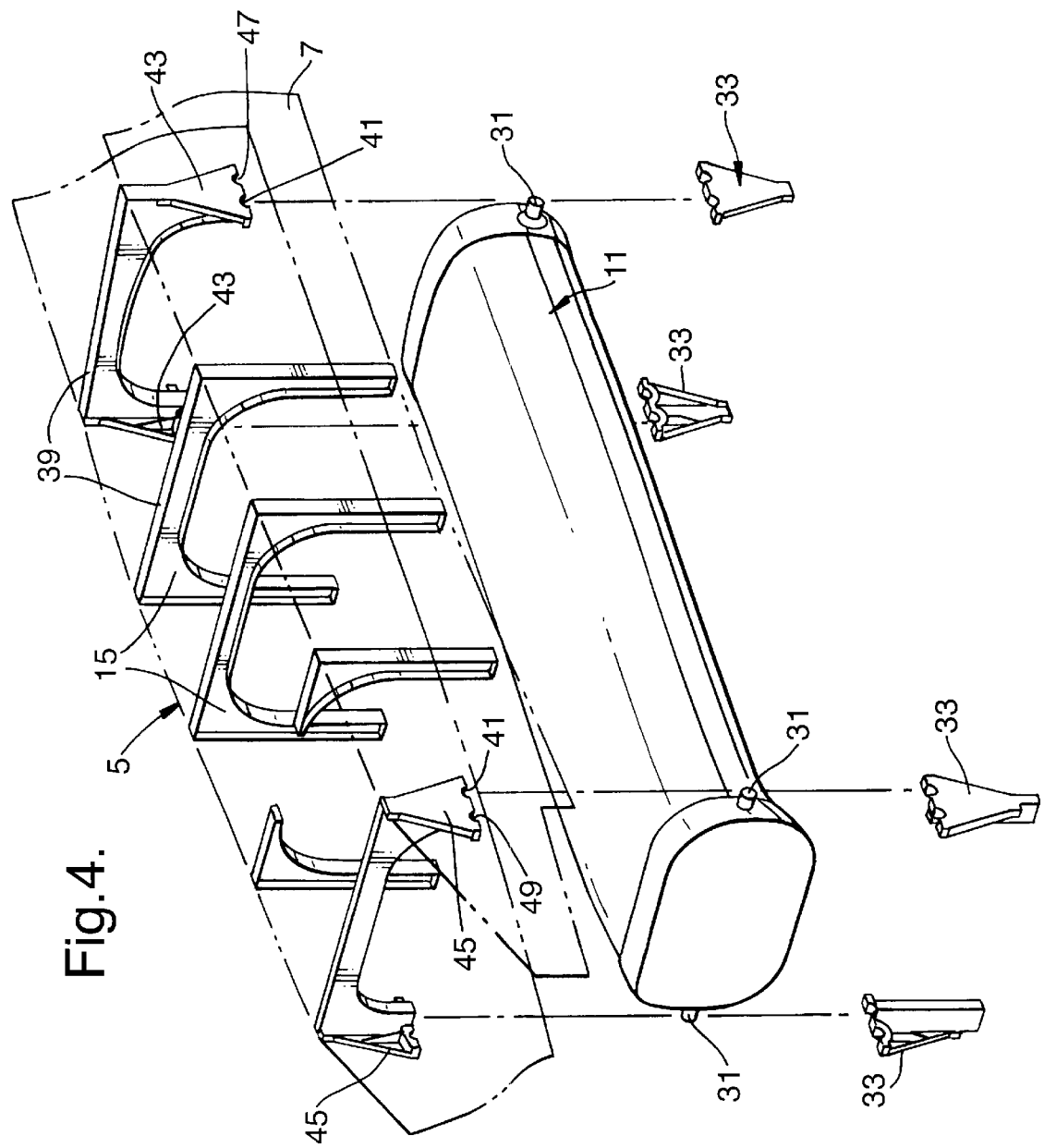

MODULAR AIR INTAKE DUCT FOR AIRCRAFT

This invention relates to the field of vehicle propulsion systems and more specifically, but not exclusively, to engine intake ducts.

Traditional design techniques and trends within the aircraft industry have led designers to produce aircraft with profiles which use double curvature panels to describe their external lines. The use of such complicated external shapes in the design of both military and civil aircraft has resulted in the need for elaborate and therefore expensive tooling used in both the manufacture of detailed parts, such as the engine intake ducts, and final assembly.

Within the military aircraft industry, traditional design drivers have been for operational performance improvements, however, more recently a switch in emphasis has been towards providing an effective balance between performance improvement and life cycle cost reductions. This new direction in aircraft design has enabled engineers to study the possibilities of eliminating the familiar double curvature airframes and additionally has provided for research into possible new methods of manufacture and assembly for engine intake ducts.

Patent application no. WO 97/22516 describes a method of assembling an aircraft from a plurality of modular structural components. This document discloses an aircraft having a common wing component and common propulsion support frame component, such that several variants of the aircraft, each variant having the different structural qualities necessary to perform different roles, could be assembled from a basic number of common components. Other modular structural components, such as flaps, may be specific to a particular variant of aircraft, and may be fixed to the common basic structure during assembly of that variant. This commonality of airframe parts allows a substantial reduction in the cost of designing and manufacturing aircraft variants requiring different structural qualities in order to fulfil their different roles.

However, it is highly desirable that just one aircraft variant is able to perform a variety of different missions. U.S. Pat. No. 3,640,492 teaches one aircraft structure which is adapted to house a variety of mission specific modules. These modules are interchangeable between the same type of aircraft and can be rapidly replaced in the event of damage or changed if the aircraft needs to be reconfigured for a different mission. Each module contains a different avionics mission system which is electrically connected to the main control system of the aircraft when the module is mechanically installed.

Providing modular mission systems for rapid role changing for different missions is useful, however, one of the prime cost driving elements associated with the final assembly of modern combat aircraft is that relating to the installation of aircraft systems. Whilst mission systems consist primarily of avionics systems, such as laser rangers for weapon delivery, which are designed to carry out specific missions, known aircraft systems are integral to the aircraft and are usually necessary for the general functioning of the aircraft, whatever the mission. The integration and final assembly of aircraft systems such as environmental control systems (ECS), engine systems and fuel systems is arguably the most time consuming and expensive area of final assembly, as well as proving time consuming and expensive in subsequent repair and maintenance, therefore much research has been conducted into the possible reduction in complexity of such systems.

Furthermore, although modular avionics systems allow one aircraft to fulfil a variety of roles, several variants still must be manufactured, for use in, for example, long range missions or those missions requiring a faster, more manoeuvrable aircraft, where it is the integral aircraft systems that need to be varied.

Patent application No. WO 97/22516 describes the building of several aircraft variants using a basic set of common structural components, to reduce the number of different structural components needed to build the family of aircraft. Variant-specific components need to be fixed to the common basic aircraft structure, and these components are also designed to meet the structural requirements of that particular variant.

Patent application No. WO 97/22516 particularly discloses three types of powerplant support systems designed to meet the different propulsion system requirements of three aircraft variants. The powerplant support systems have several components in common, and are designed to form part of the structure of the variant in which they are installed, not being readily detachable.

The present invention seeks to reduce the need for several variants of aircraft for adaptation to different roles and further seeks to reduce the cost and time factors associated with the assembly, repair and maintenance of aircraft propulsion systems.

According to the present invention in one aspect thereof there is provided a modular air intake duct system for a vehicle comprising:

at least one intake duct; and attachment means for attaching said at least one intake duct to at least one structural member of a vehicle;

wherein said at least one intake duct is adapted to be demountably attached to a load bearing structural member of said vehicle, said at least one intake duct itself being adapted to bear substantially no load; and wherein said at least one intake duct is modular, said at least one intake duct comprising at least one module.

Preferably said at least one intake duct is demountably located within a structural framework of the vehicle and does not form substantially any part of the external surface of the vehicle. Advantageously the external surface of the vehicle comprises at least one detachable panel adjacent said at least one intake duct for allowing the rapid installation and removal of said at least one intake duct. Preferably said at least one intake duct comprises three modules, these being a rearward duct module, a central duct module and a forward duct module.

The structural framework of the vehicle advantageously comprises at least one shear web, said at least one shear web being load bearing and extending substantially along the length of the vehicle. Said at least one intake duct is preferably adapted to be attached to said at least one shear web, using said attachment means. Preferably there are at least two shear webs.

The attachment means may comprise spigots and brackets. Advantageously said at least one intake duct has spigots fixed thereto.

Advantageously the attachment means further comprises frame members. The frame members preferably comprise at least two portions, each portion being adjacent a shear web and extending in a direction perpendicular to the length of the shear web. Each portion is advantageously detachably fixed to a shear web, and may be fixed using brackets.

The frame members preferably allow an intake duct to be correctly positioned between and adjacent their two portions. The frame members are advantageously adapted to hold the intake duct in a desired position, by means of the spigots fixed to the intake duct and brackets fixed to the frame members and the shear webs. To allow a different size of duct to be installed between the shear webs, the frame members may be detached from the shear webs and may be replaced by frame members of a different size, to accommodate the new duct.

The modules of said at least one intake duct may be advantageously separately removable or installable, leaving the remaining duct modules in position. The brackets are advantageously adapted to allow the spigots of each of the modules to be rapidly released.

It will be seen that using the invention, a modular intake duct of a vehicle may be changed rapidly to accommodate repairs or a role change, by removing said at least one detachable panel and releasing the spigots of all or some of the modules of the duct then replacing these modules with different ones.

At least one powerplant of the vehicle may be changed for a particular mission, and at least one intake duct or module thereof may, in accordance with the invention, be changed to be compatible with the new powerplant.

According to the present invention in another aspect thereof there is provided a modular propulsion system comprising:

at least one intake duct; and at least one powerplant; and attachment means for attaching said at least one intake duct to at least one structural member of the vehicle;

wherein said at least one intake duct is adapted to be demountably attached to a load bearing structural member of said vehicle, said at least one intake duct itself being adapted to bear substantially no load; and wherein said at least one intake duct is modular, said at least one intake duct comprising at least one module.

Preferably said at least one intake duct is demountably located within a structural framework of the vehicle and does not form substantially any part of an external surface of the vehicle.

According to the present invention in another aspect thereof, there is provided an aircraft having a modular propulsion system comprising:

at least one intake duct;

at least one powerplant; and attachment means for attaching said at least one intake duct to at least one structural member of the aircraft;

wherein said at least one intake duct is adapted to be demountably attached to a load bearing structural member of the aircraft, said at least one intake duct itself being adapted to bear substantially no load; and wherein said at least one intake duct is located within the fuselage of the aircraft such that said at least one intake duct does not form substantially any part of the external surface of the aircraft.

According to the present invention in another aspect thereof there is provided a method of assembling an aircraft having an interchangeable propulsion system including at least the steps of:

providing a load bearing structural framework within the aircraft;

mounting detachable frames on said structural framework, the detachable frames being adapted to receive a particular size of intake duct;

detachably installing an intake duct of said particular size within the detachable frames; and detachably installing a powerplant;

wherein the powerplant is interchangeable for allowing the aircraft to fulfil different roles, the intake duct is interchangeable for allowing a different size of intake duct to be used with a different powerplant and the detachable frames are interchangeable for receiving intake ducts of different sizes.

Embodiments of the present invention will now be described by way of example only and with reference to the following drawings, of which:

FIG. 2 shows an isometric view of an internal structure of an aircraft showing parts of its propulsion system.

FIG. 4 shows an exploded isometric view of a duct module of FIG. 3 ready for assembly with part of the airframe of FIG. 2.

Figure 1:
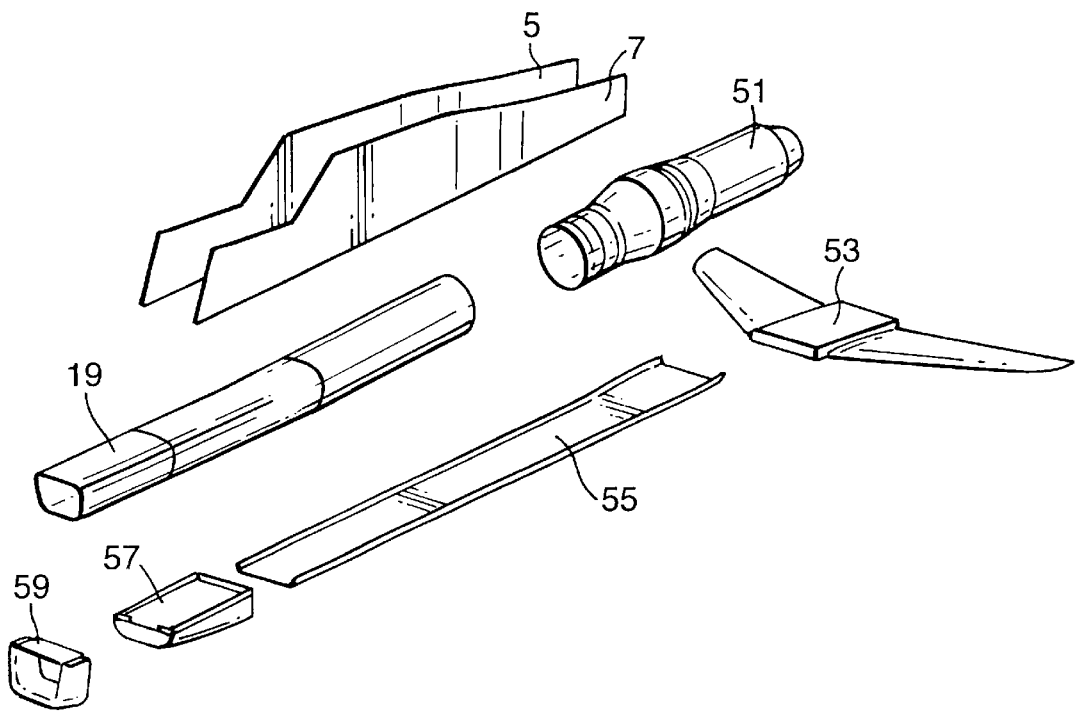
FIG. 1 shows an isometric, exploded sketch of a modular propulsion system.

FIG. 1 shows a propulsion system having an engine 51 and a duct 19 for directing air to the engine 51. The duct 19 is modular and comprises several sections which are connected together. The duct 19 and engine 51, when assembled into an airframe, fit between shear webs 5, 7. The duct 19 does not form part of the fuselage of the aircraft. A panel 55 is fitted to the aircraft structure, below the duct 19, forming part of the fuselage on the underside of the aircraft. A nosewheel module 57 is positioned between the front of the panel 55 and an intake 59. A tailplane 53 is positioned to the rear of the panel 55.

FIG. 2 shows part of an aircraft structure 1 with the outer skin removed to show the internal structure of the aircraft. The aircraft structure 1 has a propulsion system 3 which comprises two similar intake ducts 19, 21 (only duct 19 has been shown for clarity) and two engines (not shown).

The duct 19 is modular, and comprises a rearward duct portion 13, a central duct portion 11 and a forward duct portion (not shown). The duct 19 is positioned between shear webs 5, 7. A similar duct (not shown) is positioned between shear webs 7, 9.

Frames 15 are attached to the shear webs 5, 7 and brackets 17 are demountably attached to the frames 15 for retaining the duct 19.

Figure 3:
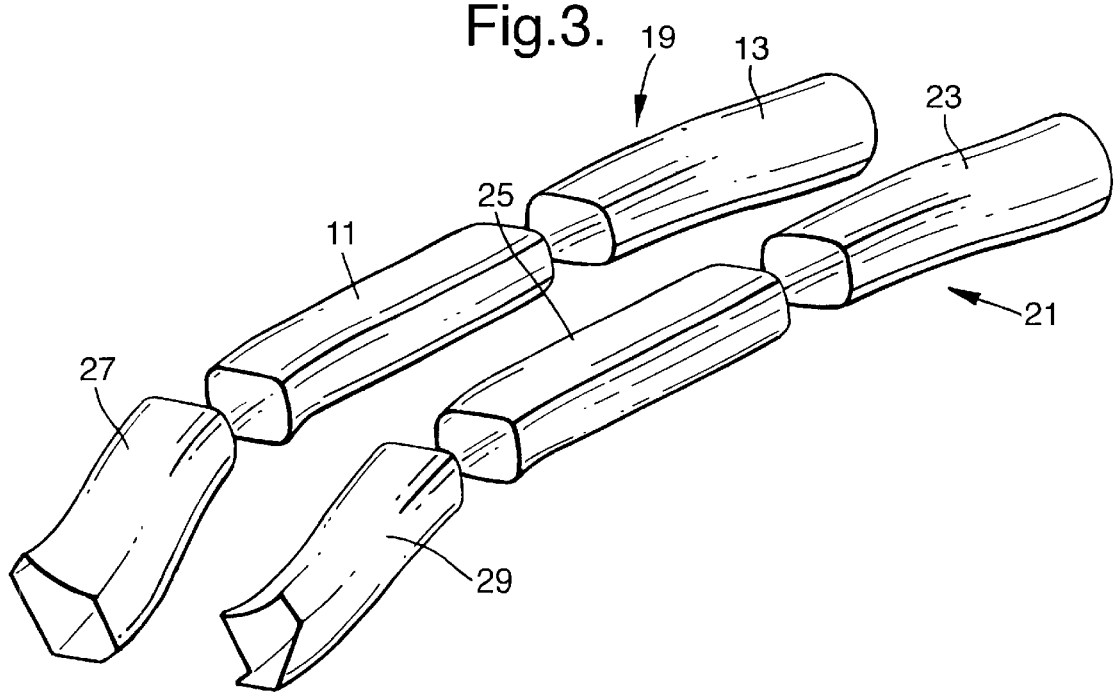
FIG. 3 shows an isometric view of duct modules of the propulsion system of the aircraft shown in FIG. 2.

FIG. 3 shows the two ducts 19, 21 ready for assembly into the aircraft structure 1 of FIG. 2. The ducts 19, 21 are modular and each comprises a rear duct portion 13, 23, a central duct portion 11, 25 and a forward duct portion 27, 29 respectively. The ducts 19, 21 have identical central duct portions 11, 25 and identical rear duct portions 13, 23, which are interchangeable modules. The forward duct portions 27, 29 however are different from each other, each being adapted to fit intakes of different shape. The forward duct portions 27, 29 may be changed or removed for repair whilst leaving the central and rear duct portions in position, due to the modular nature of the propulsion system. This represents a considerable time and cost saving over the removal and repair of known non-modular ducts, where it is necessary to remove the whole duct from the aircraft, necessitating a major strip down of the aircraft, as known ducts are integrated with the structure of the aircraft and are often difficult to access. Also, differently shaped forward duct portions may be used in place of 27, 29, to suit operational requirements.

FIG. 4 shows the central duct portion 11 of the duct 19 during assembly with the aircraft structure 1 of FIG. 2. Frames 15 are detachably fixed to the shear webs 5, 7 of the aircraft structure 1 as shown. The central duct portion has four spigots 31, two at each end. During assembly, the duct portion 11 is raised up between the shear webs 5, 7 until it is adjacent the top portion 39 of the frames 15, and the spigots 31 are resting against the spigot holes 41 in brackets 43, 45. Brackets 33 are then fixed into place on the shear webs 5, 7 to hold the spigots 31 and the duct portion 11 in a fixed position within the structure of the aircraft.

The brackets 43 have further spigot holes 47 for accommodating the spigots of a rear duct portion (not shown). Similarly, the brackets 45 have further spigot holes 49 for accommodating the spigots of a forward duct portion (not shown). In this manner the modular duct is assembled.

Figure 5:
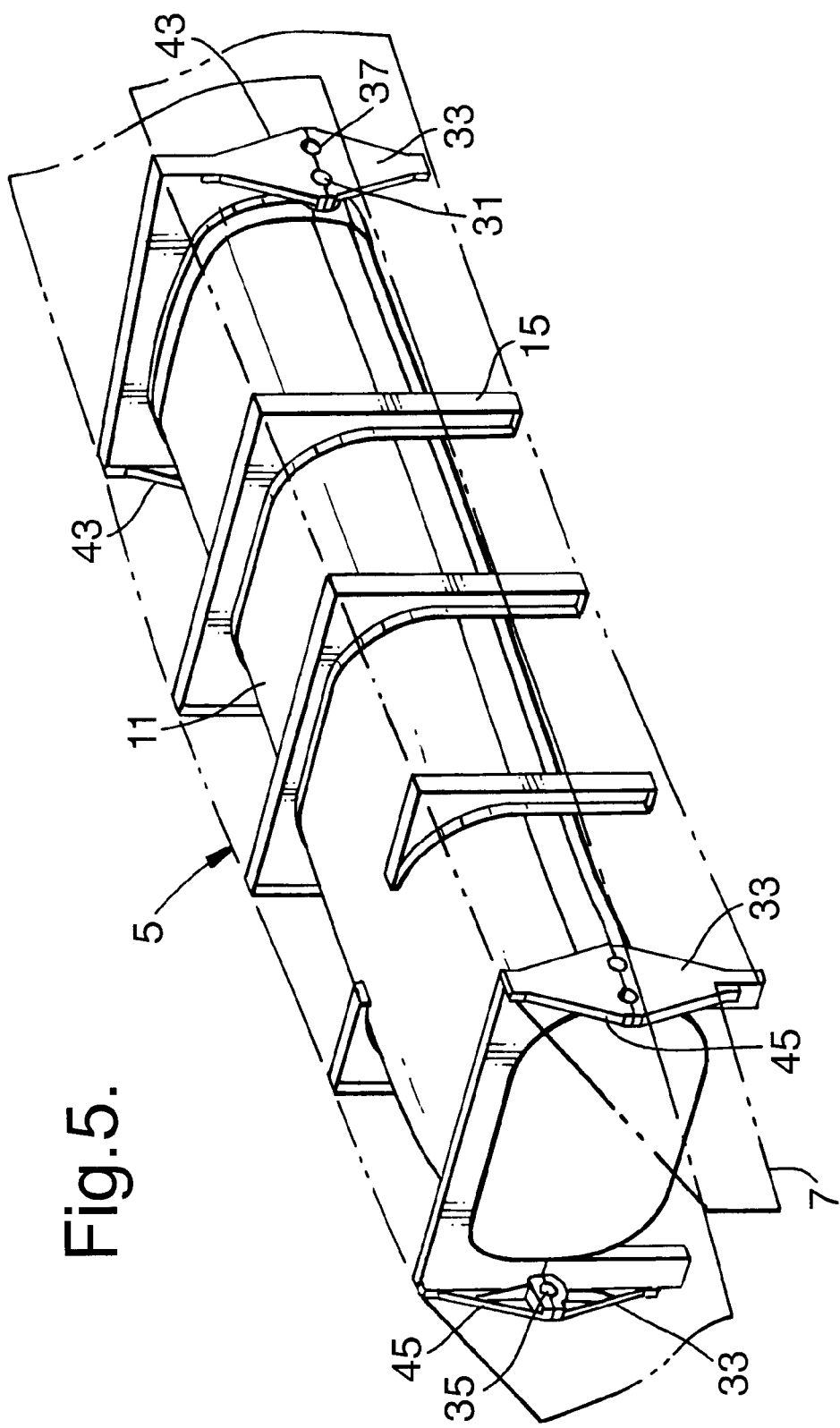
FIG. 5 shows an isometric view of the duct module and airframe of FIG. 4 when assembled.

FIG. 5 shows the central duct portion 11 of the duct 19 assembled within the aircraft structure 1. The duct portion 11 is held between the shear webs 5, 7 adjacent the frames 15. The four spigots 31 of the central duct portion 11 are held by brackets 43, 45, 33 as shown. The brackets 43, 45 are attached to the shear webs 5, 7 and the frames 15, and the duct is now fixed in position within the airframe. To remove the duct portion 11, the brackets 33 must be removed from the shear webs 5, 7 allowing the duct portion 11 to be lowered down between the shear webs 5, 7.

The spigots 37 and the spigots 35 of the rearward duct portion 13 and the forward duct portion 27 can be seen, held by the brackets 43, 33 and 45, 33 respectively.

It will be noted that the modular duct described herein does not form an integral part of the aircraft structure, and is not adapted to be a part of the load bearing structure of the airframe. The modular duct 19 may be replaced by a similar modular duct during repair, or a portion of duct 19 may be so replaced, quickly and easily.

It will also be noted that the duct 19 may be replaced with another duct having different characteristics, of shape or size for example, to suit a different engine. To achieve this, one or more portions of the duct 19 are removed as described earlier and the frames 15 holding these duct portions are then detached from the shear webs 5, 7. The frames 15 are replaced by frames of a different size adapted to allow the new duct portions to be assembled with the aircraft structure. In this manner an aircraft may be adapted to fulfil a different role through an engine and intake duct change. This allows one common airframe to be built, and a modular propulsion system to be assembled therein, to suit various missions, and so reducing the need for aircraft variants.

What is claimed is:

1. A modular air intake duct system for a vehicle comprising:
   at least one intake duct, said duct comprising at least two modules, each of said modules comprising a portion of said duct and is independently removable from said duct with respect to the other of said modules, the assembled modules forming a continuous duct; and
   attachment means for attaching said at least one intake duct to at least one structural member of a vehicle, wherein said at least one intake duct is adapted to be demountably attached to a load bearing structural member of said vehicle, said at least one intake duct itself being adapted to bear substantially no load.

2. A modular air intake duct system as claimed in claim 1 wherein said at least one intake duct comprises three modules.

3. A modular air intake duct system as claimed in claim 1 wherein said at least one intake duct is demountably located within a structural framework of the vehicle and does not form substantially any part of an external surface of the vehicle.

4. A modular air intake duct system as claimed in claim 3 wherein the external surface of the vehicle comprises at least one detachable panel adjacent said at least one intake duct for allowing the rapid installation and removal of said at least one intake duct.

5. A modular air intake duct system as claimed in claim 3 wherein the structural framework of the vehicle comprises at least one shear web, said at least one shear web being load bearing and extending substantially along the length of the vehicle.

6. A modular air intake duct system as claimed in claim 5 wherein said at least one intake duct is adapted to be attached to said at least one shear web, using said attachment means.

7. A modular air intake duct system as claimed in claim 5 wherein there are at least two shear webs.

8. A modular propulsion system comprising:
   at least one intake duct, said duct comprising at least two modules, each of said modules comprising a portion of said duct and is independently removable from said duct with respect to the other of said modules, the assembled modules forming a continuous duct;
   at least one powerplant; and
   attachment means for attaching said at least one intake duct to at least one structural member of the vehicle; wherein said at least one intake duct is adapted to be demountably attached to a load bearing structural member of said vehicle, said at least one intake duct itself being adapted to bear substantially no load.

9. A modular propulsion system as claimed in claim 8 wherein said at least one intake duct is demountably located within a structural framework of the vehicle and does not form substantially any part of an external surface of the vehicle.

10. An aircraft having a modular propulsion system comprising:
    at least one intake duct, said duct comprising at least two modules, each of said modules comprising a portion of said duct and is independently removable from said aircraft with respect to the other of said modules, the assembled modules forming a continuous duct;
    at least one powerplant; and
    attachment means for attaching said at least one intake duct to at least one structural member of the aircraft; wherein said at least one intake duct is adapted to be demountably attached to a load bearing structural member of the aircraft, said at least one intake duct itself being adapted to bear substantially no load; and wherein said at least one intake duct is located within the fuselage of the aircraft such that said at least one intake duct does not form substantially any part of the external surface of the aircraft.

11. A method of assembling an aircraft having an interchangeable propulsion system including at least the steps of:
    providing a load bearing structural framework within the aircraft;
    mounting detachable frames on said structural framework, the detachable frames being adapted to receive a particular size of intake duct;
    detachably installing an intake duct of said particular size within the detachable frames; and
    detachably installing a powerplant;
    wherein the powerplant is interchangeable for allowing the aircraft to fulfil different roles, the intake duct is interchangeable for allowing a different size of intake duct to be used with a different powerplant and the detachable frames are interchangeable for receiving intake ducts of different sizes.

* * * * *